US008879022B2

(12) United States Patent
 Oh

(10) Patent No.: US 8,879,022 B2
(45) Date of Patent: Nov. 4, 2014

(54) LIQUID CRYSTAL DISPLAY DEVICE FOR MINIMIZING INFERIORITY BY EXTERNAL AND METHOD OF MAKING THEREOF

(75) Inventor: Guen-Taek Oh, Busan (KR)

(73) Assignee: LG Display Co., Ltd., Seoul (KR)

(*) Notice: Subject to any disclaimer, the term of this patent is extended or adjusted under 35 U.S.C. 154(b) by 835 days.

(21) Appl. No.: 12/003,778

(22) Filed: Dec. 31, 2007

(65) Prior Publication Data
US 2008/0291354 A1 Nov. 27, 2008

(30) Foreign Application Priority Data

May 25, 2007 (KR) .................. 10-2007-0051091

(51) Int. Cl.
*G02F 1/1333* (2006.01)
*G02F 1/1335* (2006.01)
*G09F 13/04* (2006.01)
*F21V 7/04* (2006.01)

(52) U.S. Cl.
CPC .... *G02F 1/133308* (2013.01); *G02F 2201/503* (2013.01); *G02F 2001/133317* (2013.01)
USPC .................. 349/60; 349/58; 349/62; 349/64; 349/65; 362/516; 362/615; 362/97.1; 362/97.2

(58) Field of Classification Search
USPC ............ 349/58, 60, 62, 64–65; 362/615, 561, 362/97.1
See application file for complete search history.

(56) References Cited

U.S. PATENT DOCUMENTS

| 2002/0030771 | A1* | 3/2002 | Kim ................................ 349/61 |
| 2003/0030763 | A1* | 2/2003 | Nishioka ......................... 349/61 |
| 2003/0117710 | A1* | 6/2003 | Miyamoto .................... 359/613 |
| 2004/0243238 | A1* | 12/2004 | Arnin et al. ................. 623/17.12 |
| 2005/0068470 | A1* | 3/2005 | Won ................................ 349/58 |
| 2005/0243238 | A1* | 11/2005 | Cha et al. ........................ 349/58 |
| 2007/0047265 | A1* | 3/2007 | Kang et al. .................... 362/634 |
| 2008/0002093 | A1* | 1/2008 | Kim ................................ 349/58 |

FOREIGN PATENT DOCUMENTS

| KR | 10-1998-0083546 A | 12/1998 |
| KR | 10-2002-0015238 A | 2/2002 |
| KR | 10-2007-0000548 A | 1/2007 |

* cited by examiner

*Primary Examiner* — Lauren Nguyen
(74) *Attorney, Agent, or Firm* — McKenna Long & Aldridge LLP

(57) ABSTRACT

Disclosed is a liquid crystal display (LCD) device capable of stable support of components. The LCD device comprises an LCD panel; a main support for supporting edges of the LCD panel; a light guide plate disposed at a rear side of the LCD panel; and at least one first pad for preventing the movement of the light guide plate through contact with the light guide plate between the main support and the light guide plate, wherein at least one first pad supporting portion is formed at one surface of the main support being faced with the light guide plate. Accordingly, defects of the LCD device resulting from an external force such as impact or heat are minimized, and the LCD device has a firm and stable structure.

4 Claims, 5 Drawing Sheets

US 8,879,022 B2

LIQUID CRYSTAL DISPLAY DEVICE FOR MINIMIZING INFERIORITY BY EXTERNAL AND METHOD OF MAKING THEREOF

This application claims the benefit of Korean Patent Application No. 2007-0051091, filed on May 25, 2007, which is hereby incorporated by reference for all purposes as if fully set forth herein.

BACKGROUND OF THE INVENTION

1. Field of the Invention

The present invention relates to a liquid crystal display (LCD) device, and more particularly, to an LCD device having a firm and stable structure capable of minimizing damage resulting from an external force such as impact or heat.

2. Discussion of the Related Art

Generally, an LCD device displays a desired image by controlling the optical transmittance of liquid crystal cells arranged in a matrix according to image signal information. The LCD device displays images on an LCD panel by using light irradiated from a backlight unit.

As shown in the related art FIG. 1, the LCD device 1 comprises an LCD panel 20, an optical sheet 40 disposed at a rear side of the LCD panel 20, a main support 30 for supporting the optical sheet 40 by separating the optical sheet 40 from the LCD panel 20, a light guide plate 50 disposed on a rear surface of the optical sheet 40, an optical source (not shown) disposed along edges of the light guide plate 50, a reflection sheet 60 disposed on a rear surface of the light guide plate 50, a bottom cover 70 for accommodating the main support 30, the optical sheet 40, the light guide plate 50, and the reflection sheet 60 therein, and a top cover 10 coupled to the bottom cover 70.

The LCD panel 20 includes a thin film transistor (TFT) substrate 21 having a plurality of pixels and TFTs, a color filter substrate 22 facing the TFT substrate 21 and being attached thereto, an LC layer (not shown) disposed between the two substrates 21 and 22, a first polarizer 23 attached onto an outer surface of the TFT substrate 21, and a second polarizer 24 attached onto an outer surface of the color filter substrate 22.

Edges of the LCD panel 20 are supported by the main support 30.

The main support 30 includes a body portion (not shown) shaped roughly as a square ring, and an extended portion (not shown) extending from the body portion (not shown) between the LCD panel 20 and the optical sheet 40. The main support 30 supports the LCD panel 20 by separating from the optical sheet 40. The LCD panel 20 is supported by the extended portion 32. A coupling unit (not shown) for stably coupling the main support 30 and the bottom cover 70 to each other is disposed at one side of the body portion 31.

The reflection sheet 60, the light guide plate 50, and the optical sheet 40 are sequentially disposed on the bottom cover 70. The bottom cover 70 and the main support 30 significantly influence horizontal and vertical motion of the reflection sheet 60, the light guide plate 50 and the optical sheet 400.

However, the LCD device 1 experiences problems in that each component thereof may be deformed or slid by an external impact such as vibration. More specifically, when an external impact such as vibration and heat, having a binding force larger than a binding force between the lower cover 70 and the main support 30, or larger than a binding force between the bottom cover 70 and the top cover 10 is applied to the LCD device 1, the LCD panel 20, the optical sheet 40, the light guide plate 50 and the reflection sheet 60 and other components may become separated from one another. "Binding force" means the force necessary to hold various components together. Furthermore, noise or damage may result from a reciprocal friction of the components.

In order to solve the structural problems of the related art LCD device, an LCD device capable of stably supporting each component such as the LCD panel 20, the optical sheet 40, the light guide plate 50, and the reflection sheet 60 is absolutely required.

SUMMARY OF THE INVENTION

Accordingly, the present invention is directed to a liquid crystal display device having a firm and stable structure that may be capable of minimizing problems resulting from external forces such as impact or heat.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, there is provided a liquid crystal display (LCD) device, comprising: an LCD panel; a main support for supporting edges of the LCD panel; a light guide plate disposed at a rear side of the LCD panel; and at least one first pad for preventing the movement of the light guide plate through contact with the light guide plate between the main support and the light guide plate, wherein at least one first pad supporting portion is formed at one surface of the main support being faced with the light guide plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 illustrates the need for more than an adhesion member.

DETAILED DESCRIPTION OF THE ILLUSTRATED EMBODIMENTS

Reference will now be made in detail to embodiments of the present invention, examples of which are illustrated in the accompanying drawings.

Hereinafter, an LCD device according to first to third embodiments of the present invention will be explained in more detail with reference to the attached drawings.

Figure 1:
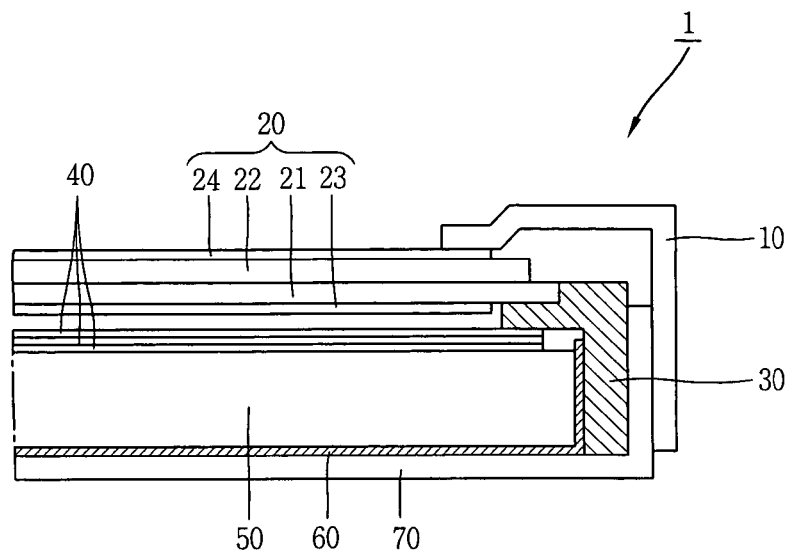
FIG. 1 is a sectional view showing a structure of an LCD device in accordance with the related art.
Figure 2:
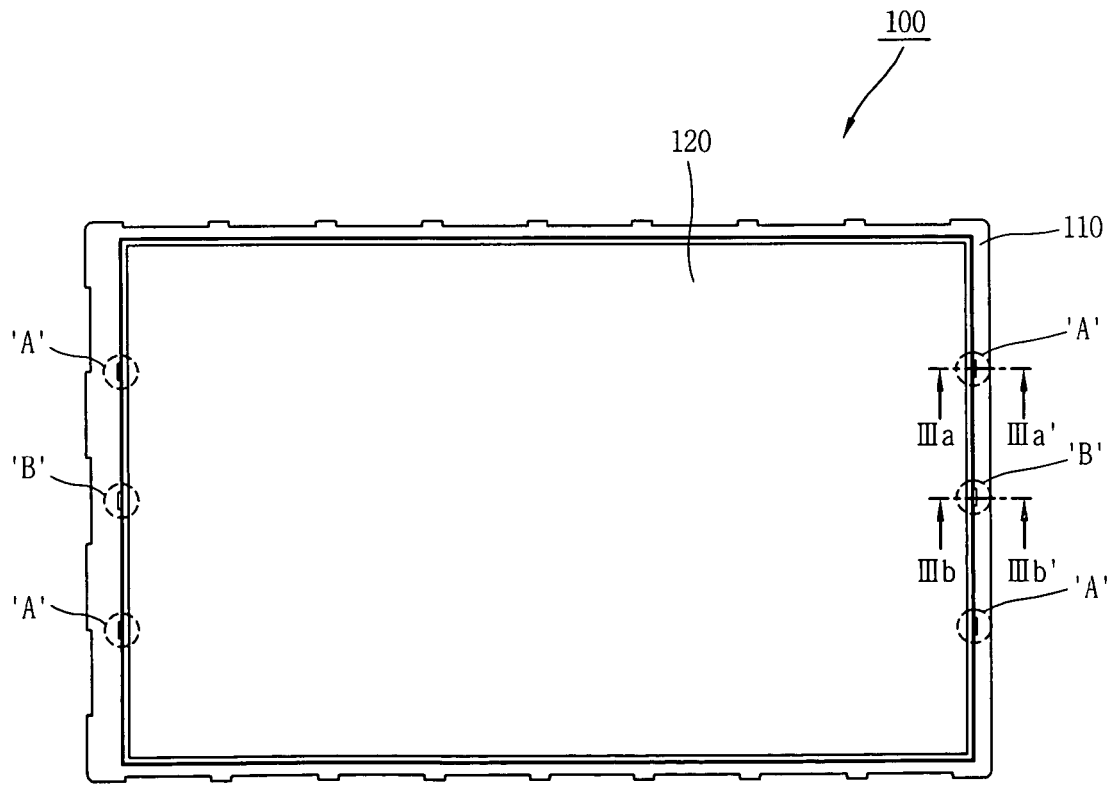
FIG. 2 is a planar view of an LCD device according to a first embodiment of the present invention.
Figure 3:
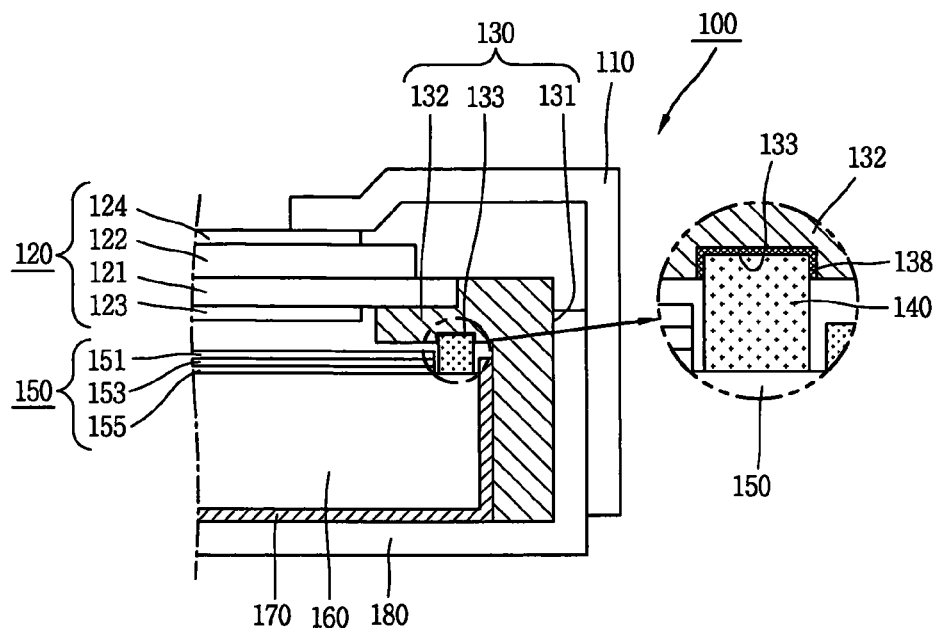
FIG. 3 is a sectional view showing a first pad supporting portion according to an embodiment.
Figure 4:
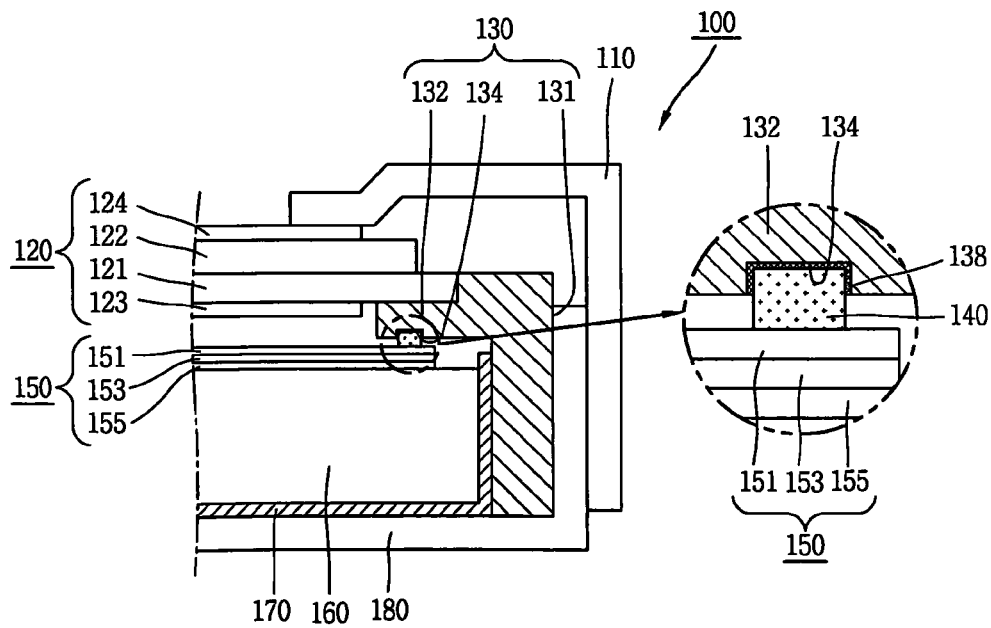
FIG. 4 is a sectional view showing a second pad supporting portion according to another embodiment.

FIG. 2 is a planar view of an LCD device according to a first embodiment of the present invention, FIG. 3 is a sectional view showing a first pad supporting portion, and FIG. 4 is a sectional view showing a second pad supporting portion.

As shown in FIGS. 2, 3 and 4, an LCD device 100 comprises an LCD panel 120 for forming an image, a main support 130 for supporting edges of the LCD panel 120, an optical sheet 150 disposed at a rear side of the main support 130, a light guide plate 160 disposed at a rear side of the optical sheet 150, an optical source (not shown) disposed at a side surface of the light guide plate 160, a reflection sheet 170 disposed at a rear side of the light guide plate 160, and top and bottom covers 110 and 180 coupled to each other for accommodating each of the components therein.

The top cover 110 is a structure for supporting edges of a front surface of the LCD panel 120. A display window through which an effective surface (a display region) of the LCD panel 120 is viewable is formed at the top cover 110. A coupling means such as a hook (not shown), for example, to be coupled with the bottom cover 180 is disposed at a side surface of the top cover 110.

The LCD panel 120 includes a thin film transistor (TFT) substrate 121, a color filter substrate 122 facing the TFT substrate 121 and being attached thereto, an LC layer (not shown) disposed between the TFT substrate 121 and the color filter substrate 122, a first polarizer 123 attached onto an outer surface of the TFT substrate 121, and a second polarizer 124 attached onto an outer surface of the color filter substrate 122. The LCD panel 120 is formed as LC cells constituting a pixel unit that are arranged in a matrix form. The LCD panel 120 forms an image by controlling the optical transmittance of the LC cells according to image signal information transmitted from a driving unit (not shown). The LCD panel 120 is mainly formed in a rectangular shape having long and short edges.

A plurality of gate lines and data lines are formed on the TFT substrate 121 in a matrix form, and each TFT is formed at each intersection between the gate lines and the data lines. A signal voltage transmitted from the driving unit (not shown) is applied between a pixel electrode and a common electrode of the color filter substrate 122 through the TFT. The LC layer is aligned according to the signal voltage, thereby affecting optical transmittance.

The color filter substrate 122 may include a color filter having repeating R, G and B color filters and may also include a black matrix and a common electrode. The common electrode may be formed of a transparent conductive material such as Indium Tin Oxide (ITO) or Indium Zinc Oxide (IZO). The color filter substrate 122 may have a smaller area than that of the TFT substrate 121.

The first and second polarizers 123 and 124 are disposed to cross each other. The first polarizer 123 polarizes light incident onto the LCD panel 120, and the second polarizer 124 serves as an analyzer.

The main support 130 is formed along edges of the LCD panel 120, and may have a substantially rectangular ring shape. The main support 130 is accommodated in the bottom cover 180, and supports the LCD panel 120 by separating from the optical sheet 150 and the light guide plate 160. The main support 130 is coupled to the bottom cover 180, thereby accommodating the optical sheet 150, the light guide plate 160, the optical source (not shown) and the reflection sheet 170 therein and supporting them.

Figure 6:
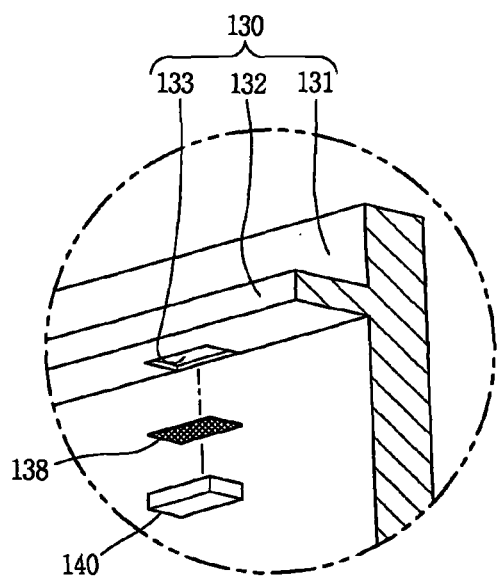

As shown in FIGS. 3 and 6, the main support 130 according to the first embodiment of the present invention includes a body portion 131, an extended portion 132 extended from the body portion 131 between the LCD panel 120 and the optical sheet 150, and one or more first and second pad supporting portions 133 and 134 formed on one surface of the extended portion 132 in a direction towards the light guide plate 160.

The body portion 131 may have a substantially square ring shape, and a coupling means such as a hook (not shown) may be disposed at one side of the body portion 131. As the body portion 131 is disposed to be adjacent to one side of the bottom cover 180, the main support 130 is coupled to the bottom cover 180 thus to be firmly and stably fixed. The extended portion 132 supports the LCD panel 120 by separating from the optical sheet 150 and the light guide plate 160. As shown in FIGS. 3, 4 and 6, the first and second pad supporting portions 133 and 134 are implemented as cavities concaved at one surface of the extended portion 132. More specifically, the first pad supporting portion 133 includes a first pad accommodating cavity for partially or entirely accommodating the first pad 140, and the second pad supporting portion 134 includes a second pad accommodating cavity for partially or entirely accommodating the second pad 145. The first pad supporting portion 133 is disposed to accommodate the first pad 140 at an opposite side to the light guide plate 160, and the second pad supporting portion 134 is disposed to accommodate the second pad 145 at an opposite side to the optical sheet 150. As indicated in FIG. 2, one pair of the first pad supporting portions 133 are disposed at a short edge of the extended portion 132 with a certain distance therebetween ('A'). One second pad supporting portion 134 is disposed between the two first pad supporting portions 133 ('B'). However, the position and the number of the first and second pad supporting portions 133 and 134 may be varied when necessary.

Figure 5:
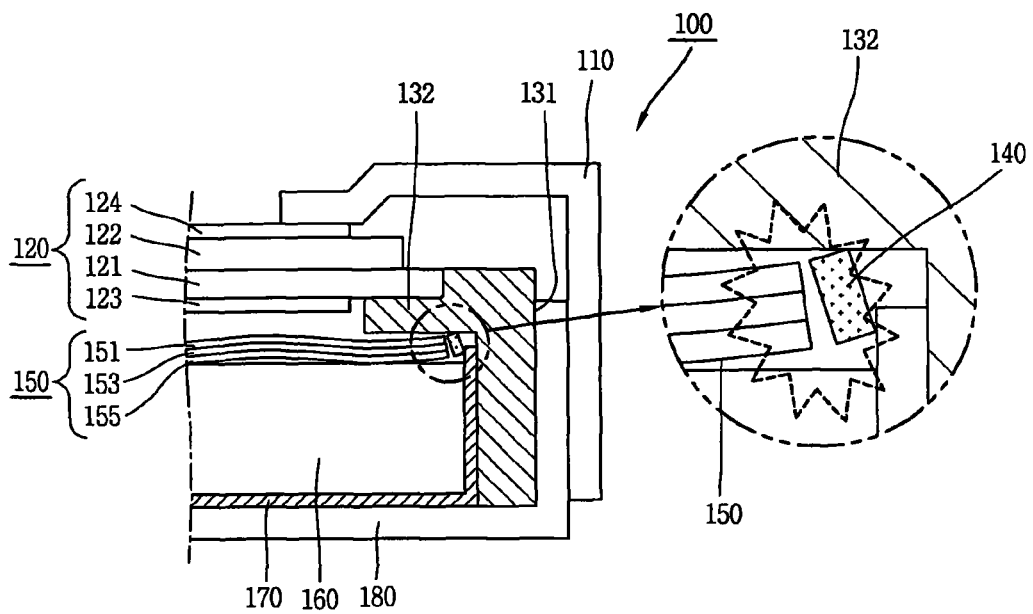
FIGS. 5 and 6 are views showing each structure and function of a first pad and a first pad supporting portion of the LCD device according to a first embodiment of the present invention.

The reason why the first and second pad supporting portions 133 and 134 are implemented as concavities will be explained by taking an example of the first pad supporting portion 133 and the first pad 140. As shown in FIG. 5, when the first pad 140 is attached onto the extended portion 132 by using only an adhesion member 138 such as a double sided tape, the first pad 140 may be separated from the extended portion 132 by a strong external force for example, (vibration, impact, or heat). That is, the first pad 140 cannot endure a strong external force such as vibration, heat, or impact only by an adhesion force of the adhesion member attached thereto. Accordingly, a binding force between each of the components is lowered, and noise or damage may be caused by a reciprocal friction of the components.

In order to solve the problem, in the first embodiment of the present invention, a cavity having a certain depth is formed at a position where the first pad 140 is to be formed. Then, the first pad 140 is mounted in the cavity, thereby minimizing problems such as sliding or separation of the first pad 140. That is, since the first pad supporting cavity for structurally supporting the first pad 140 is provided, a degree or freedom of the first pad 140 is reduced thus to decrease a moving degree of the first pad 140 in x, y and z directions. The adhesion member 138 such as a double sided tape is adhered to the first pad supporting portion 133, thereby minimizing the inferiority of the first pad 140. Accordingly, the inferiority of the first pad 140 is solved, and a binding force between each of the components is enhanced, thereby implementing the stable and firm LCD device 100. The aforementioned embodiment was explained by taking an example of only the first pad 140 and the first pad supporting portion 133. However, the aforementioned embodiment may be applied to the second pad 145 and the second pad supporting portion 134.

The first pad 140 is disposed between the light guide plate 160 and the main support 130, thereby preventing a motion of the light guide plate 160 and maintaining a certain gap between the light guide plate 160 and the LCD panel 120. One end of the first pad 140 contacts one surface of the light guide plate 160, and another end of the first pad 140 is accommodated in the first pad supporting portion 133. The second pad 145 is disposed between the optical sheet 150 and the main support 130, thereby preventing a movement of the optical sheet 150 and maintaining a certain gap between the optical sheet 150 and the LCD panel 120. One end of the second pad 145 contacts one surface of the optical sheet 150, and another end of the second pad 145 is accommodated in the second pad supporting portion 134. Preferably, the first pad 140 and the second pad 145 are respectively formed of an elastic material that can absorb an external impact and cause no inferiority such as a scratch when contacting the optical sheet 150 and the light guide plate 160.

The first pad 140 and the second pad 145 may be either a silicon pad or a urethane pad, respectively, or other suitable materials.

The optical sheet 150 consists of a passivation sheet 151, a prism sheet 153 and a diffusion sheet 155, respectively, disposed on a rear surface of the LCD panel 120. Although not shown, the diffusion sheet 155 consists of a base plate, and a bead-shaped coating layer formed on the base plate. The diffusion sheet 155 diffuses light generated from an optical source (not shown) thus to diffuse light to the LCD panel 120. The diffusion sheet 155 may be used as two or three sheets overlapped with each other. Although not shown, the prism sheet 153 may have a triangular prism arranged with a certain pattern on an upper surface thereof. The prism sheet 153 collects light diffused by the diffusion sheet 155 to a planar surface of the LCD panel 120 in a vertical direction. Light having passed through the prism sheet 153 proceeds in a vertical direction thus to provide a uniform brightness. The passivation sheet 151 protects the prism sheet 153 susceptible to a scratch. The passivation sheet 151 may contact the second pad 145.

The light guide plate 160 is disposed at a rear side of the LCD panel 120, and guides light generated from an optical source (not shown) to a rear surface of the LCD panel 120. The light guide plate 160 includes an incident surface for receiving light from an optical source (not shown), an exit surface facing the rear surface of the LCD panel 120, and a rear surface having a pattern so that light irradiated to the incident surface from the optical source can proceed to the exit surface. The rear surface of the light guide plate 160 faces the reflection sheet 170. Accordingly, the light guide plate 160 converts light irradiated from the optical source (not shown) adjacent to the incident surface to the incident surface into planar light, thereby uniformly transmitting the planar light to the LCD panel 120 through the exit surface. Generally, the light guide plate 160 may be formed in a substantially rectangular shape having long and short edges. As another embodiment, the light guide plate 160 may be formed in a wedge shape having a thickness decreased towards another side from one side. An edge of one surface of the light guide plate 160 towards the LCD panel 120 may contact the first pad 140.

Although not shown, an optical source (not shown) is respectively disposed at both long edges of the light guide plate 160. As the optical source, a cold cathode fluorescent lamp (CCFL), a heat cathode fluorescent lamp (HCFL), an external electrode fluorescent lamp (EEFL) or a light emitting diode (LED) array may be used.

The reflection sheet 170 is disposed at a lower side of the light guide plate 160. The reflection sheet 170 reflects light incident to a lower side of the light guide plate 160 from an optical source (not shown), thereby proceeding to an upper side. The reflection sheet 170 may be formed of Polyethylene Terepthalate (PET) or Polycarbonates (PC) or other suitable materials. The reflection sheet 170 may be coated with silver or aluminum or other suitable materials.

The optical sheet 150, the light guide plate 160, the optical source (not shown), and the reflection sheet 170 are accommodated in the main support 130 and the bottom cover 180 coupled to each other. The bottom cover 180 is coupled to the top cover 110, thereby accommodating the LCD panel 120, the main support 130, the first and second pads 140 and 145, the optical sheet 150, the light guide plate 160, the optical source (not shown), and the reflection sheet 170 therein.

Figure 7:
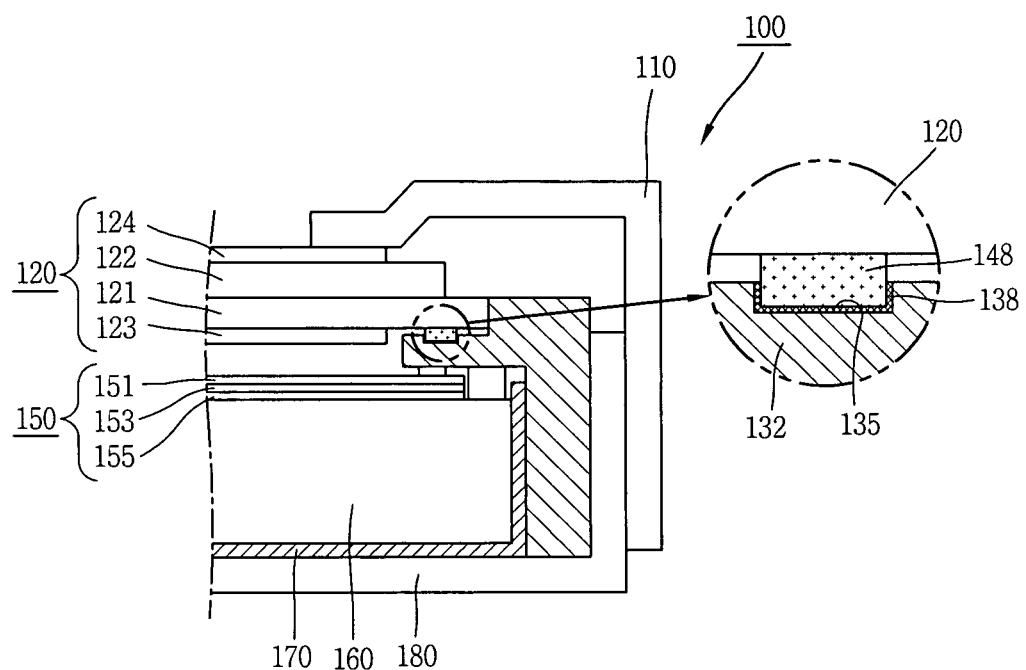
FIG. 7 is a view showing a structure of an LCD device according to a second embodiment of the present invention.

Hereinafter, an LCD device according to a second embodiment of the present invention will be explained with reference to FIG. 7.

The same reference numerals as those of the first embodiment are given to the same parts as those of the second embodiment, and only differences from the first embodiment will be explained.

When compared with the LCD device according to the first embodiment, an LCD device 100 according to the second embodiment of the present invention further comprises a third pad supporting portion 135 and a third pad 148. The third pad supporting portion 135 is disposed on one surface of an extended portion 132 which is towards the LCD panel 120. The third pad supporting portion 135 is formed as a cavity for partially accommodating the third pad 148. The third pad 148 is disposed between the LCD panel 120 and the main support 130, thereby preventing movement of the LCD panel 120. One end of the third pad 148 contacts an edge of the LCD panel 120, and another end of the third pad 148 is accommodated in the third pad supporting portion 135. Like the first and second pads 140 and 145, the third pad may be either a silicon pad or a urethane pad or other suitable material.

Although not shown, the LCD device 100 according to the second embodiment of the present invention may include only the first pad 140 and the first pad supporting portion 133, or only the second pad 145 and the second pad supporting portion 134.

Hereinafter, an LCD device according to a third embodiment of the present invention will be explained with reference to FIGS. 8 and 9.

The same reference numerals as those of the first embodiment are given to the same parts as those of the third embodiment, and only differences from the first embodiment will be explained.

Figure 8:
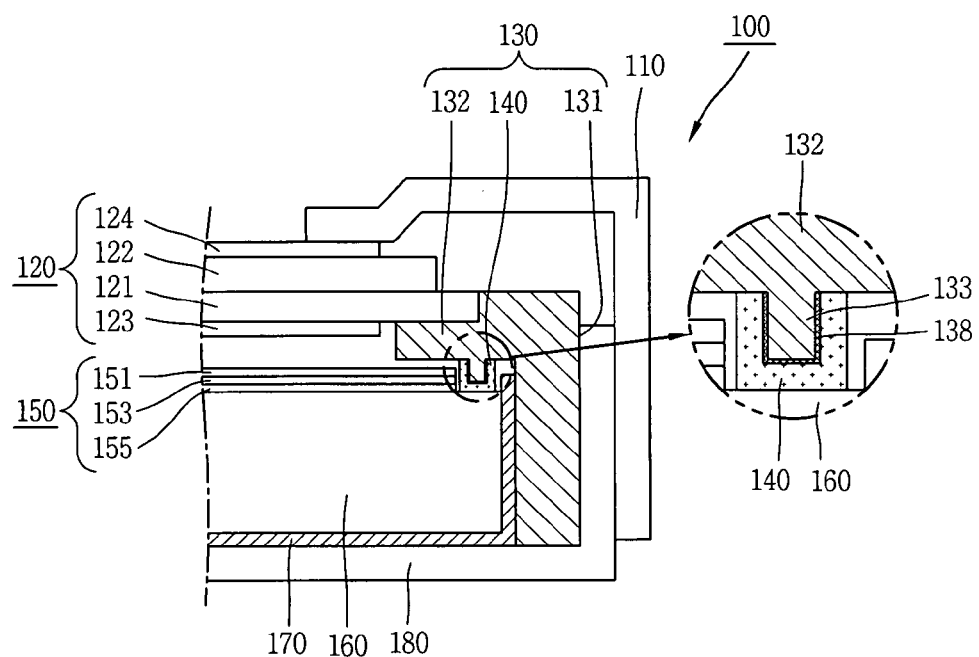
FIGS. 8 and 9 are views respectively showing a structure and function of an LCD device according to a third embodiment of the present invention.
Figure 9:
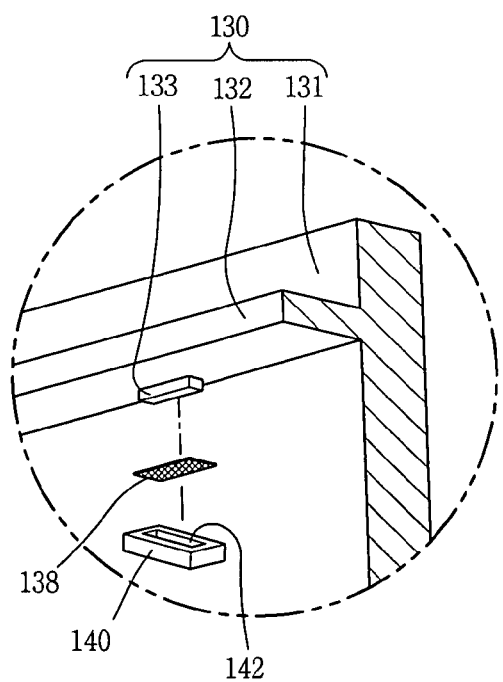

As shown in FIG. 8, an LCD device 100 according to the third embodiment of the present invention includes a pad and a pad supporting portion having different structures and shapes from those of the first embodiment.

Hereinafter, different structures and shapes of the LCD device 100 according to the third embodiment from those of the first embodiment will be explained by taking an example of a first pad 140 and a first pad supporting portion 133.

The first pad supporting portion 133 of the third embodiment includes a first pad protrusion portion protruded from one surface of an extended portion 132 towards a light guide plate 160, and the first pad 140 includes a first inserting cavity 141 inserted by the first pad protrusion portion. The first pad supporting portion 133 of the first embodiment is concaved (refer to FIG. 6), whereas the first pad supporting portion 133 of the third embodiment is embossed. An adhesion member 138 such as an adhesive is deposited on the embossed first pad supporting portion 133. As shown in FIG. 9, the adhesion member 138 is deposited on the embossed first pad supporting portion 133. Then, the first pad 140 is coupled to the first pad supporting portion 133 so that the first inserting cavity 141 can be inserted into the first pad supporting portion 133. Accordingly, the first pad 140 is firmly and stably fixed to the first pad supporting portion 133. Herein, the adhesion member may not be required.

The LCD device according to the third embodiment was explained based on the first pad supporting portion 133 and the first pad 140. However, the technical features of the LCD device according to the third embodiment may be equally applicable to a second pad supporting portion 134, a third pad supporting portion 135, a second pad 145, and a third pad 148. That is, a second pad supporting portion (not shown) may protrude towards an optical sheet 150, and a second pad (not shown) may include a second inserting cavity. A third pad supporting portions (not shown) may protrude towards an LCD panel 120, and a third pad (not shown) may include a third inserting cavity.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   an LCD panel having a color filter and a thin film transistor substrates;
   a main support including an extended portion for supporting edges of the LCD panel on a front surface of the extended portion;
   a light guide plate disposed at a rear side of the LCD panel and the extended portion;
   an optical sheet on the light guide plate between the light guide plate and a rear surface of the extended portion;
   a first and a second pad supporting portions in the rear surface of the extended portion facing front surfaces of the light guide plate and the optical sheet, the first and the second pad supporting portions including a first and a second concaved grooves facing the front surfaces of the light guide plate and the optical sheet, respectively;
   a first pad in the first pad supporting portion, with one end surface contacting the first groove, and extending between the extended portion with an opposing end surface in direct contact with the front surface of the light guide plate facing the LCD panel; and
   a second pad in the second pad supporting portion, with one end surface contacting the second groove, and extending between the extended portion with an opposing end surface in direct contact with the front surface of the optical sheet.

2. The liquid crystal display (LCD) of claim 1, further comprising an adhesive between the first and the second pads and the main support.

3. The liquid crystal display (LCD) of claim 1, wherein the opposing end portion of the first pad contacts the light guide plate so that a side surface of the optical sheet is contacted with a side surface of the first pad.

4. A method of making a liquid crystal display (LCD) device, comprising:
   forming an LCD panel having a color filter and a thin film transistor substrates;
   forming a main support including an extended portion for supporting edges of the LCD panel on a front surface of the extended portion;
   disposing a light guide plate at a rear side of the LCD panel and the extended portion;
   disposing an optical sheet on the light guide plate between the light guide plate and a rear surface of the extended portion;
   forming a first and a second pad supporting portions in the rear surface of the extended portion facing front surfaces of the light guide plate and the optical sheet, the first and the second pad supporting portions including a first and a second concaved grooves facing the front surfaces of the light guide plate and the optical sheet, respectively;
   disposing a first pad in the first pad supporting portion, with one end surface contacting the first groove, and extending between the extended portion with an opposing end surface in direct contact with the front surface of the light guide plate facing the LCD panel; and
   disposing a second pad in the second pad supporting portion, with one end surface contacting the second groove, and extending between the extended portion with an opposing end surface in direct contact with the front surface of the optical sheet.

* * * * *